E. G. STAUDE.

DRIVING PINION.

APPLICATION FILED MAY 31, 1919.

Reissued July 29, 1919.

14,700.

*Inventor*

*Edwin G. Staude*

*By* Paul H. Paul

*his Attorneys.*

UNITED STATES PATENT OFFICE.

EDWIN G. STAUDE, OF MINNEAPOLIS, MINNESOTA.

DRIVING-PINION.

14,700. Specification of Reissued Letters Patent. Reissued July 29, 1919.

Original No 1,300,786, dated April 15, 1919, Serial No. 133,452, filed November 25, 1916. Application for reissue filed May 31, 1919. Serial No. 301,099.

*To all whom it may concern:*

Be it known that I, EDWIN G. STAUDE, a citizen of the United States, resident of Minneapolis, county of Hennepin, State of Minnesota, have invented certain new and useful Improvements in Driving-Pinions, of which the following is a specification.

The object of my invention is to provide a pinion adapted for driving a gear and provided with means for checking the speed of the pinion.

A further object is to provide a combined pinion and brake drum adapted for mounting on the axle of the traction wheels for regulating the speed thereof.

The invention consists generally in various constructions and combinations, all as hereinafter described and particularly pointed out in the claims.

Figure 1:
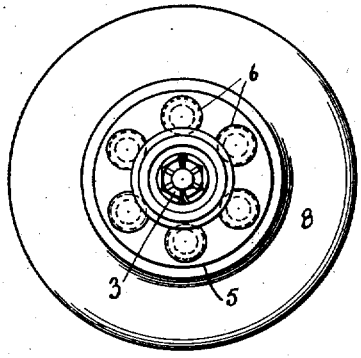
Figure 2:
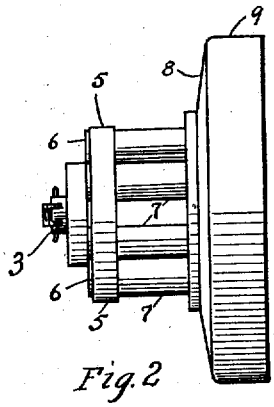
Figure 3:
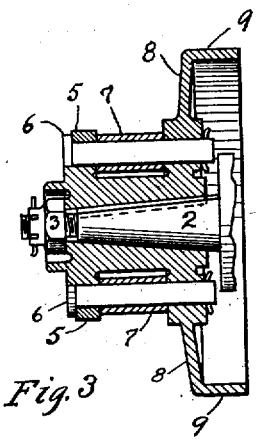

In the accompanying drawings forming part of this specification,

Figure 1 is an end view of an axle and driving pinion with my brake drum mounted thereon, Fig. 2 is a plan view of the same, Fig. 3 is a sectional view through the drum and pinion.

In the drawing, 2 represents an axle spindle, preferably tapered, and having a threaded outer end with a nut 3 mounted thereon. 5 is a pinion, here shown as of the lantern type, having pins 6 and anti-friction rollers 7 mounted thereon and spaced apart sufficiently to receive the teeth of the driven gear. An annular flange 8 extends outwardly from the inner end of the hub of the pinion and terminates in a brake-engaging surface 9 at right angles substantially to the flange 8 and forming a surface to receive a brake strap. The flange 8 and the hub of the pinion are preferably formed in one piece, as indicated in Fig. 3. The pinion is here shown of the lantern type, but any other style of pinion may be used, if preferred. Its function is to transmit power from the spindle 2 to the gear of a traction or other wheel, and is used particularly when it is desired to convert an automobile, such as a Ford, into a tractor. At such time the rear wheels of the automobile are removed and the pinion substituted therefor and positioned to mesh with the teeth of the gears of the traction wheels (not shown) the braking surface of the flange 9 being sufficient to engage with a brake band and check the revolution of the driving pinion to stop the traction.

I claim as my invention:

1. The combination, with an axle spindle, of a pinion hub fitting thereon and having flanged ends and pins mounted in said flanges to form a lantern pinion, the inner flange of said hub having an annular web radiating therefrom terminating in a flanged portion which extends in a direction parallel substantially with the axis of said hub and having a friction surface.

2. The combination, with an axle spindle, of a pinion hub fitting thereon and having peripheral teeth and a flanged inner end provided with an integral annular web radiating therefrom, said web terminating in a flanged portion which extends in a direction parallel substantially with the axis of said hub and is provided with an internal friction surface.

EDWIN G. STAUDE.

In presence of—
H. C. RAYMER,
LILLIAN RINGER.

Copies of this patent may be obtained for five cents each, by addressing the "Commissioner of Patents, Washington, D. C."